United States Patent [19]

Yamamoto

[11] Patent Number: 4,742,642
[45] Date of Patent: May 10, 1988

[54] SWABBING DEVICE FOR A HERBICIDE APPLICATOR

[75] Inventor: Kenzo Yamamoto, Wakayama, Japan

[73] Assignee: Yamaho Kogyo Co., Ltd., Wakayama, Japan

[21] Appl. No.: 895,902

[22] Filed: Aug. 12, 1986

[30] Foreign Application Priority Data

Oct. 8, 1985 [JP] Japan .......................... 60-154938[U]

[51] Int. Cl.$^4$ .............................................. A01G 13/00
[52] U.S. Cl. ........................................ 47/1.5; 401/286
[58] Field of Search .................... 47/1.5, 1.7, 48.5; 239/172; 401/286, 283, 270; 222/187

[56] References Cited

U.S. PATENT DOCUMENTS

| | | | |
|---|---|---|---|
| 2,741,510 | 4/1956 | McCulloch | 47/1.7 |
| 3,016,653 | 1/1962 | Gardner | 47/1.7 |
| 3,184,888 | 5/1965 | Fruth et al. | 47/1.5 |
| 4,518,118 | 5/1985 | Takata | 239/172 |

FOREIGN PATENT DOCUMENTS

650317 10/1962 Canada .................. 47/1.5

Primary Examiner—Robert A. Hafer
Assistant Examiner—Bradley M. Lewis
Attorney, Agent, or Firm—Wenderoth, Lind & Ponack

[57] ABSTRACT

A herbicide applicator including a plurality of swabbing devices for applying a herbicide to weeds which includes a plurality of nozzles adapted to be removably mounted on a herbicide supply pipe through branch connections. A swabbing member made of fabric material is pressed against the bottom of a respective one of the nozzles. This arrangement allows easy replacement of each swabbing member.

16 Claims, 2 Drawing Sheets

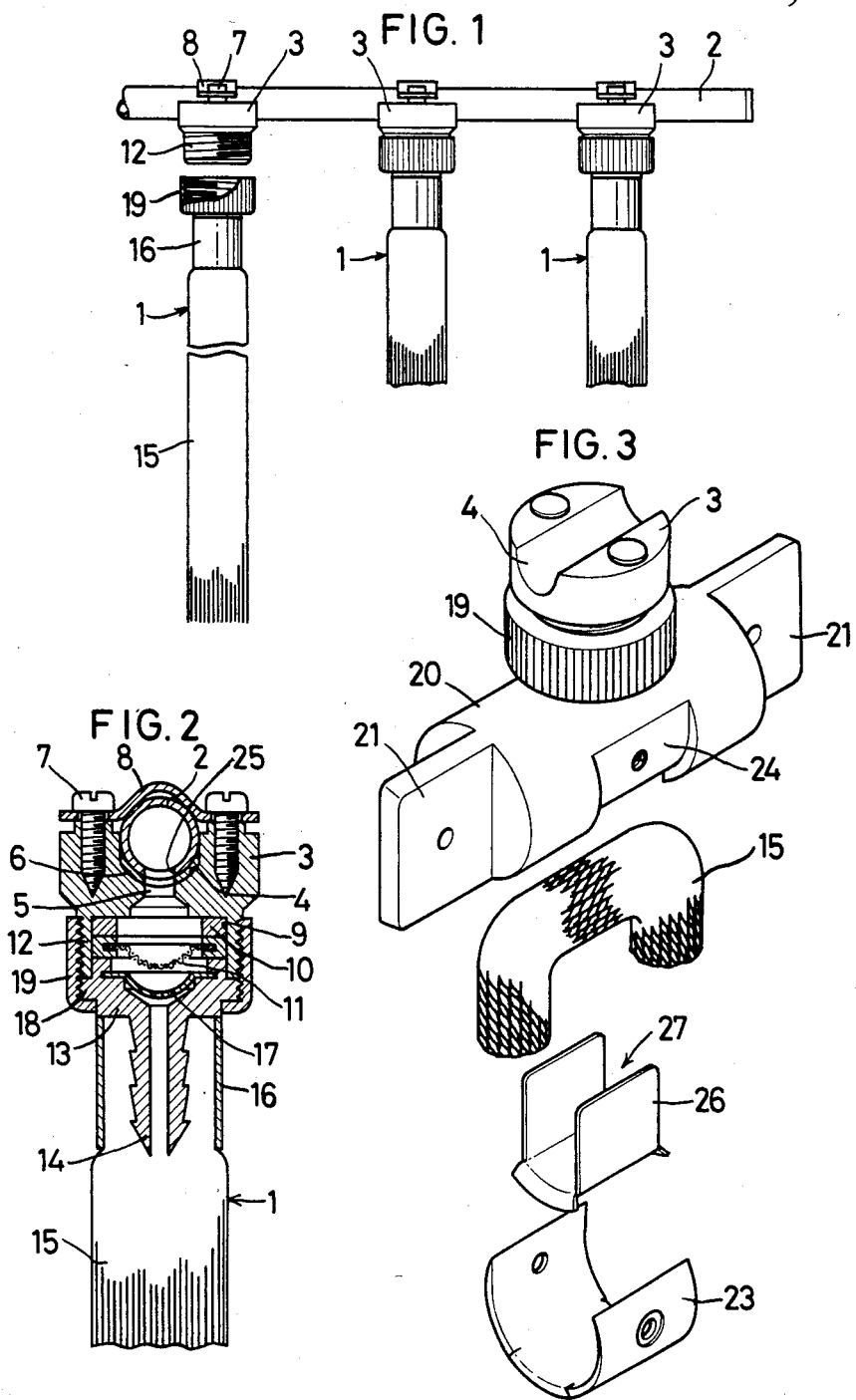

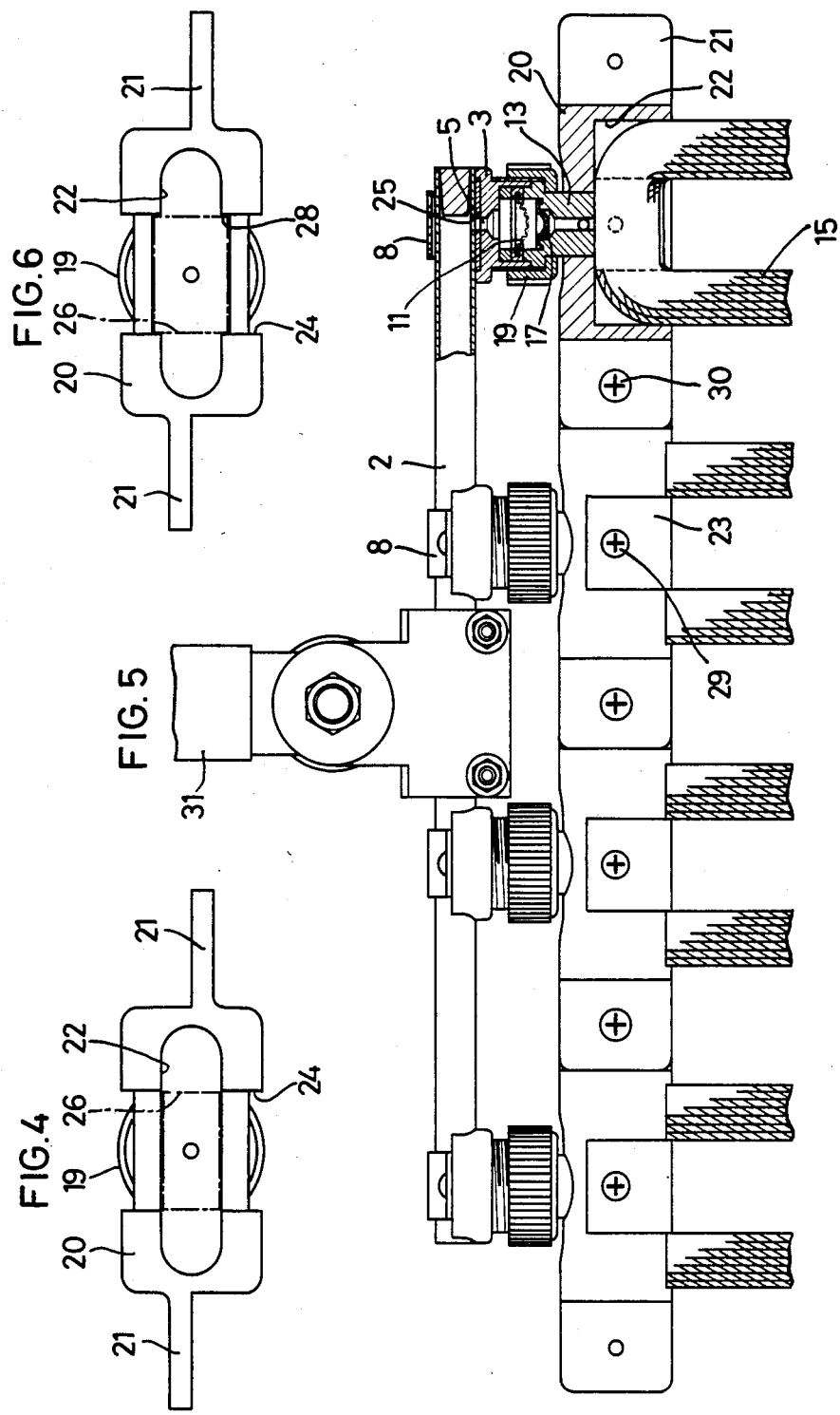

SWABBING DEVICE FOR A HERBICIDE APPLICATOR

BACKGROUND OF THE INVENTION

The present invention relates to a swabbing device for a herbicide applicator.

Japanese Utility Model Application No. 58-138891 discloses a herbicide applicator developed by the present applicant. This herbicide applicator includes a handle, a herbicide supply pipe perpendicularly fastened to an end of the handle, a plurality of swabbing devices mounted on the herbicide supply pipe and adapted to be supplied with a herbicide through the handle and the pipe, and a bundle of coarse yarn forming a part of each swabbing device and adapted to be permeated by the herbicide supplied from the herbicide supply pipe.

Quite often the bundles of coarse yarn have to be replaced with another for the following reasons by way of example: First, because of high frequency of use, the bundles of coarse yarn become worn out. Second, the bundles of coarse yarn are not well-groomed after use but caked with unused herbicide. Third, the permeability of the bundles of coarse yarn has to be adjusted to the viscosity of a herbicide which is going to be next used with the apparatus.

SUMMARY OF THE INVENTION

It is an object of the present invention to provide a swabbing device which allows each bundle of coarse yarn to be quickly replaced with another through a simple procedure.

In order to attain the above-mentioned object, the swabbing device in accordance with the present invention includes a plurality of branch connections mounted on a herbicide supply pipe, a nozzle removably connected to each branch connection, and a bundle of coarse yarn mounted at the discharge opening of the nozzle and adapted to be replaced with another by separating the nozzle from the branch connection.

When it becomes necessary to replace each bundle of coarse yarn with another because, e.g., of their having been worn out, the bundles of coarse yarn can be easily and quickly removed by separating the nozzles from the branch connections.

With the above-described object in view and as will become apparent from the following detailed description, the present invention will be more clearly understood in connection with the accompanying drawings.

BRIEF DESCRIPTION OF THE DRAWINGS

FIG. 1 is a front view of an embodiment of the present invention;

FIG. 2 is an enlarged vertical section thereof;

FIG. 3 is an exploded perspective view of another embodiment of the present invention;

FIG. 4 is a bottom view of the body thereof;

FIG. 5 is an elevation partly in section of a herbicide applicator incorporating the second embodiment of the present invention; and FIG. 6 is a bottom view of another example of the body thereof.

DETAILED DESCRIPTION OF THE INVENTION

Referring now to FIGS. 1 and 2, a swabbing device 1 in accordance with the present invention is connected, by a screw coupling, to a branch connection 3 mounted on a herbicide supply pipe 2 of a herbicide applicator (not shown). The branch connection 3 has a longitudinally extending, semi-circular groove 4 formed in a top surface thereof, which conforms to and is generally complementary to the peripheral surface of the pipe 2. A hole 5 provided in the branch connection and passing through the bottom of the groove 4 communicates with the interior of the pipe 2 by a hole 25 provided in the wall of the pipe 2. A packing 6 having an aperture therein aligned with the holes 5 and 25 is sealably engaged between the pipe 2 and the branch connection 3.

A metal fitting 8 is secured to the upper surface of the branch connection 3 by means of screws 7 so as to hold the pipe 2 therebetween. A packing 10 is disposed in a depression 9 formed in the lower end face of the branch connection 3. A strainer 11 is also disposed in the depression 9 and abuts on the under surface of the packing 10. An external thread 12 is formed in the lower half of an outer cylindrical surface of the branch connection 3.

A nozzle 13 is partially inserted into the depression 9 so as to allow a discharge opening 14 to project downwardly therefrom. For the exudation of the herbicide, one end of a swabbing member 15 such as a textile rope or a bundle of coarse yarn is allowed to fit over the discharge opening 14 and fastened tightly with a clamping sleeve 16. The nozzle 13 accommodates an orifice plate 17, which can be replaced with another one having a different orifice bore suited for the viscosity of a herbicide so that the permeability of the swabbing member 15 can be adjusted to the type of weed being treated.

When a clamping nut 19 is screwed on the external thread 12, a collar 18 provided on an outer cylindrical surface of the nozzle 13 is held between the branch connection 3 and the clamping nut 19. Consequently, the swabbing device 1 is connected to the branch connection 3. By unscrewing the clamping nut 19, the swabbing device 1 can be separated from the branch connection 3 as shown in the leftmost part of FIG. 1.

Referring now to FIGS. 3 to 6, the second embodiment of the present invention includes a longitudinally extending cylindrical body 20, both end faces of which are each formed with a coupling flange 21 for effecting a series connection of a plurality of bodies 20. Inwardly of the end faces and longitudinally extending sides of the body 20 is a longitudinally extending recess 22 which extends upwardly through the undersurface of the body 20 (FIGS. 4 to 6). Each of the sides of the body 20 have a depression 24 formed in a lower part thereof for receiving a respective upwardly extending leg of a U-shaped semicylindrical keep plate 23. The nozzle 13 tightly fits in a radially extending hole provided in the body 20 such that the lower end of the nozzle 13 is flush with the innermost surface of the recess 22 (FIG. 5).

In this embodiment, the swabbing member 15 is U-shaped with the middle portion of the swabbing member 15 inserted into a space 27 between sidewalls of a U-shaped fitting 26 having a channel section. Then the fitting 26 holding the middle portion of the swabbing member 15 is inserted into the central portion of the recess 22 as shown with dot-and-dash lines in FIG. 4 so as to allow the swabbing member 15 to hang down from both end portions of the recess 22 as shown in the rightmost part of FIG. 5. The insertion of the fitting 26 into the recess 22 is made feasible by the width of the fitting 26 conforming to the width of the recess 22.

Another example of the body 20 is shown in FIG. 6, wherein a portion of the recess 22 is widened along the length thereof by providing opposed slots in the longitudinal inner sidewalls of the recess 22, and these slots are defined by shoulders 28 such that the fitting 26 snugly fits in the space longitudinally left between the shoulders 28. This construction facilitates the work of inserting the fitting 26 into the recess 22.

When the middle portion of the swabbing member 15 has been inserted into the recess 22 by means of the fitting 26, the upwardly extending legs of the semicylindrical keep plate 23 are fitted into the depressions 24 and secured to the body 20 by means of screws 29 to hold the middle portion of the swabbing member against the lower projecting end of the nozzle 13, as shown in FIG. 5.

Then a series connection of a plurality of bodies 20 is effected by overlapping a coupling flange 21 of one body 20 and that of another body 20 and fastening them together by means of a screw 30. The bodies 20 are maintained in alignment since the flanges 21 of each body 20 are offset from each other such that a plane passing through the longitudinal axis of the body 20 contains one of the side faces of each flange 21. Then the bodies 20 connected in series are secured to the pipe 2 by means of the metal fittings 8 in such a manner that the holes 5 are aligned with the holes 25.

The pipe 2 is fastened to an end of, and adapted to be supplied with a herbicide through, a handle 31. When each branch connection 3 is supplied with the herbicide under pressure through the handle 31 and the pipe 2, the herbicide flows through a hole in the orifice plate 17 with the result that the middle portion of the swabbing member 15 is impregnated with the herbicide. Then, by capillary action, both end portions of the swabbing member 15 are gradually permeated by the herbicide.

In operation, a herbicide applicator provided with the swabbing device 1 is dragged in a weedy yard, etc with the result that a herbicide permeating the swabbing member 15 sticks to the weeds and causes them to wither.

What I claim is:

1. A swabbing device for a herbicide applicator having a supply pipe for supplying a herbicide, said swabbing device comprising a nozzle having a through hole therein, a swabbing member made of fabric material and removably mounted on said nozzle at a point adjacent to one end of said through hole of said nozzle, means for clamping said swabbing member on said nozzle, a branch connection means removably mounted on said supply pipe and formed with a through hole so as to communicate with the inside of said pipe, means removably coupling said nozzle to said branch connection means so that the through hole in said nozzle will communicate with the through hole in said branch connection means, said means for clamping said swabbing member on said nozzle comprising a body having a hole therein in which said nozzle is fitted, said body including a longitudinally extending recess in fluid communication with said hole in said body, said clamping means further including keep plate means for removably securing said swabbing member in said recess of said body.

2. A swabbing device for a herbicide applicator as claimed in claim 1, further comprising an orifice plate mounted in said nozzle for adjusting the flow rate of a herbicide through said nozzle.

3. A swabbing device for a herbicide applicator as claimed in claim 1, wherein said nozzle includes a lower end projecting downwardly from said branch connection means to an upper inner surface of said recess in said body, said swabbing member being mounted in said recess in contact with the projecting lower end of the nozzle.

4. A swabbing device for a herbicide applicator as claimed in claim 3, wherein said swabbing member is U-shaped with two downwardly extending portions and a middle portion therebetween, the middle portion of the swabbing member being pressed by said keep plate means against the projecting lower end of said nozzle.

5. A swabbing device for a herbicide applicator as claimed in claim 1, wherein said body includes a flange at each opposite longitudinal end thereof to form a pair of flanges, at least one of said flanges being fitted to a flange of a second body forming part of a second swabbing device, said second swabbing device comprising a nozzle having a through hole therein, a swabbing member made of fabric material and removably mounted on said nozzle at a point adjacent to one end of said through hole of said nozzle, means for clamping said swabbing member on said nozzle, a branch connection means removably mounted on said supply pipe and formed with a through hole so as to communicate with the inside of said pipe, means removably coupling said nozzle to said branch connection means so that the through hole in said nozzle will communicate with the through hole in said branch connection means, said means for clamping said swabbing member on said nozzle comprising a body having a hole therein in which said nozzle is fitted, said body including a longitudinally extending recess in fluid communication with said hole in said body, said clamping means further including keep plate means for removably securing said swabbing member in said recess of said body.

6. A swabbing device for a herbicide applicator as claimed in claim 1, wherein said body includes a pair of depressions, each of which is on an opposite side of said body, said depressions being disposed with said recess therebetween, said keep plate means comprising a U-shaped plate having a pair of legs, each of which is fitted in a respective one of said depressions in said body.

7. A swabbing device for a herbicide applicator as claimed in claim 4, further comprising a U-shaped fitting removably fitted in said recess of said body, said U-shaped fitting having a pair of sidewalls with a space therebetween, said middle portion of said swabbing member being fitted in said space between said sidewalls of said fitting.

8. A swabbing device for a herbicide applicator as claimed in claim 7, wherein said recess includes a portion thereof which is wider than the remainder of said recess, said wider portion being defined by a pair of opposed slots in longitudinal sidewalls of said recess, said fitting being removably fitted in said slots.

9. A herbicide applicator having a supply pipe with a plurality of discharging holes therein for supplying a herbicide and a plurality of swabbing devices, each of said swabbing devices comprising a nozzle having a through hole therein, a swabbing member made of fabric material and removably mounted on said nozzle at a point adjacent to one end of said through hole of said nozzle, means for clamping said swabbing member on said nozzle, a branch connection means removably mounted on said supply pipe and formed with a through hole so as to communicate with one of said discharge holes in said pipe, means removably coupling said nozzle to said branch connection means so that the through hole in said nozzle will communicate with the through hole in said branch connection means, said means for clamping said swabbing member on said nozzle comprising a body having a hole therein in which said nozzle is fitted, said body including a longitudinally extending recess in fluid communication with said hole in said body, said clamping means further including keep plate means for removably securing said swabbing member in said recess of said body.

10. A herbicide applicator as claimed in claim 9, further comprising an orifice plate mounted in said nozzle for adjusting the flow rate of a herbicide through said nozzle.

11. A herbicide applicator as claimed in claim 9, wherein said nozzle includes a lower end projecting downwardly from said branch connection means to an upper inner surface of said recess in said body, said swabbing member being mounted in said recess in contact with the projecting lower end of the nozzle.

12. A herbicide applicator as claimed in claim 11, wherein said swabbing member is U-shaped with two downwardly extending portions and a middle portion therebetween, the middle portion of the swabbing member being pressed by said keep plate means against the projecting lower end of said nozzle.

13. A herbicide applicator as claimed in claim 9, wherein said body includes a pair of depressions, each of which is on an opposite side of said body, said depressions being disposed with said recess therebetween, said keep plate means comprising a U-shaped plate having a pair of legs, each of which is fitted in a respective one of said depressions in said body.

14. A swabbing device for a herbicide applicator as claimed in claim 12, further comprising a U-shaped fitting removably fitted in said recess of said body, said U-shaped fitting having a pair of sidewalls with a space therebetween, said middle portion of said swabbing member being fitted in said space between said side walls of said fitting.

15. A herbicide applicator as claimed in claim 9, wherein said body includes a flange at each opposite longitudinal end thereof to form a pair of flanges, at least one of said flanges being fitted to a corresponding flange of an adjacent body forming part of another one of said swabbing devices, whereby each of said swabbing devices is coupled to said supply pipe by said coupling means and at least another one of said swabbing devices by fitting one of said flanges thereon to a corresponding one of said flanges of an adjacent one of said swabbing devices.

16. A swabbing device for a herbicide applicator as claimed in claim 14, wherein said recess includes a portion thereof which is wider than the remainder of said recess, said wider portion being defined by a pair of opposed slots in longitudinal sidewalls of said recess, said fitting being removably fitted in said slots.

* * * * *